United States Patent
Ikeda et al.

(10) Patent No.: US 10,104,388 B2
(45) Date of Patent: Oct. 16, 2018

(54) VIDEO PROCESSING SYSTEM WITH HIGH DYNAMIC RANGE SENSOR MECHANISM AND METHOD OF OPERATION THEREOF

(71) Applicant: Sony Corporation, Tokyo (JP)

(72) Inventors: Masaru Ikeda, San Jose, CA (US); Ali Tabatabai, Cupertino, CA (US); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 14/319,750

(22) Filed: Jun. 30, 2014

(65) Prior Publication Data

US 2015/0382006 A1    Dec. 31, 2015

(51) Int. Cl.
  *H04N 19/50*    (2014.01)
  *H04N 5/235*    (2006.01)
  *H04N 5/355*    (2011.01)
  *H04N 9/04*    (2006.01)

(52) U.S. Cl.
  CPC .......... *H04N 19/50* (2014.11); *H04N 5/2355* (2013.01); *H04N 5/35554* (2013.01); *H04N 9/045* (2013.01)

(58) Field of Classification Search
  None
  See application file for complete search history.

(56) References Cited

U.S. PATENT DOCUMENTS

| | | | |
|---|---|---|---|
| 7,362,894 B2 | 4/2008 | Ono et al. | |
| 8,014,445 B2 | 9/2011 | Segall et al. | |
| 8,335,385 B2 | 12/2012 | Strom et al. | |
| 9,479,695 B2 * | 10/2016 | Lim | H04N 5/23229 |
| 9,531,958 B2 * | 12/2016 | Kasai | H04N 5/2353 |
| 2004/0218830 A1 | 11/2004 | Kang et al. | |
| 2006/0133688 A1 | 6/2006 | Kang et al. | |
| 2007/0258641 A1 * | 11/2007 | Srinivasan | H03M 7/24 382/166 |
| 2010/0183071 A1 | 7/2010 | Segall et al. | |

(Continued)

FOREIGN PATENT DOCUMENTS

| | | | | |
|---|---|---|---|---|
| EP | 2640065 A1 | 9/2013 | | |
| WO | WO 2012147018 A2 * | 11/2012 | | H04N 19/46 |
| WO | 2013164915 A1 | 11/2013 | | |

OTHER PUBLICATIONS

Definition of "bitstream" from: http://www.dictionary.com/browse/bitstream (Searched Jul. 11, 2017).*

(Continued)

*Primary Examiner* — Md N Haque
*Assistant Examiner* — Tyler W. Sullivan
(74) *Attorney, Agent, or Firm* — Haverstock & Owens LLP (57) ABSTRACT

A video processing system and the method of operation thereof includes several elements. The elements include: a high dynamic range (HDR) optical sensor having long exposure patterns and short exposure patterns; a prediction component, coupled to the HDR optical sensor, for generating a prediction from the long exposure patterns and the short exposure patterns; a fixed length coding component, coupled to the prediction component, for encoding an enhanced HDR bit stream from the prediction; and a HDR display device for displaying a delivered digital data stream, transformed from the enhanced HDR bit stream.

24 Claims, 8 Drawing Sheets

(56) References Cited

U.S. PATENT DOCUMENTS

| | | | |
|---|---|---|---|
| 2011/0033127 A1* | 2/2011 | Rasmusson | G06T 9/00 |
| | | | 382/238 |
| 2012/0257079 A1* | 10/2012 | Ninan | H04N 5/2355 |
| | | | 348/222.1 |
| 2013/0051700 A1* | 2/2013 | Jo | H04N 5/23254 |
| | | | 382/284 |
| 2013/0063622 A1* | 3/2013 | Schoeberl | H04N 5/23248 |
| | | | 348/222.1 |
| 2013/0071022 A1 | 3/2013 | Jia et al. | |
| 2013/0108183 A1 | 5/2013 | Bruls et al. | |
| 2013/0202202 A1 | 8/2013 | Hasu | |
| 2014/0050271 A1 | 2/2014 | Su et al. | |
| 2014/0247870 A1* | 9/2014 | Mertens | H04N 19/46 |
| | | | 375/240.08 |
| 2015/0029358 A1* | 1/2015 | Kaizu | H04N 9/07 |
| | | | 348/223.1 |
| 2017/0195596 A1* | 7/2017 | Vogelsang | H04N 5/35581 |

OTHER PUBLICATIONS

International Search Report and Written Opinion for PCT App # PCT/US2015/028165 dated Aug. 19, 2015.

Cheuk-Hong Cheng et al., "Hight Dynamic Range Image Capturing By Spatial Varying Exposed Color Filter Array with Specific Demosaicking Algorithm", IEEE Pacific Rim Conference on Communications, Computers and Signal Processing (PACRIM 2009), IEEE, Pisataway, NJ, USA, Aug. 23, 2009 (Aug. 23, 2009), pp. 648-653, XP031549184, ISBN: 978-1-4244-4560-8 *the whole document*.

European Search Report from EP Application No. 15814514.4 dated Nov. 7, 2017.

* cited by examiner

VIDEO PROCESSING SYSTEM WITH HIGH DYNAMIC RANGE SENSOR MECHANISM AND METHOD OF OPERATION THEREOF

TECHNICAL FIELD

The present invention relates generally to a video processing system, and more particularly to a system for operating high dynamic range image sensors in a video processing system.

BACKGROUND ART

High dynamic range displays provide a significant improvement over prior art display technology. These devices produce a peak brightness that is an order of magnitude larger than conventional technology and a dynamic range that approaches the capabilities of a human observer. Additionally, these devices provide an enlarged color gamut and can reduce the motion blur in an Liquid Crystal Display (LCD) system. The result is a compelling viewing experience that is easily differentiated from prior art display technology.

Unfortunately, current technology does not natively support high dynamic range content and the resulting artifacts can be distracting in the context of the scene. Standard dynamic range sensor techniques are designed for current display technology and built on the assumption that high dynamic range content cannot be reproduced and therefore should be discarded.

While the direct extension of storage and distribution systems to support high dynamic range content is possible, it is problematic. In the case of a digital image stream, a larger bit-length for each pixel is required. While for the case of an analog system, reduced electrical noise is absolutely necessary. This results in significant cost and performance trade-offs in the current product offerings. Due to artifacts caused by high dynamic range data stream, image quality of traditional, standard dynamic range displays can be decreased by accommodating the high dynamic range content. Consumers are unlikely to find this acceptable because of the sharp contrasts and motion artifacts associated with the increase in dynamic range of the input stream and the inability to process the additional information correctly due to the increased bandwidth requirements for the high dynamic range data stream.

Thus, a need still remains for a video processing system that can capture, compress, and display high dynamic range video content for either still or motion video processing. In view of the exponential growth in the use of video and still cameras in personal electronic devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a video processing system including: accessing a high dynamic range (HDR) optical sensor having long exposure patterns and short exposure patterns; generating a prediction from the long exposure patterns and the short exposure patterns; encoding an enhanced HDR bit stream from the prediction; and displaying a delivered digital data stream, transformed from the enhanced HDR bit stream, on a HDR display device.

The present invention provides a video processing system, including: a high dynamic range (HDR) optical sensor having long exposure patterns and short exposure patterns; a prediction unit, coupled to the HDR optical sensor, for generating a prediction from the long exposure patterns and the short exposure patterns; a fixed length coding unit, coupled to the prediction unit, for encoding an enhanced HDR bit stream from the prediction; and a HDR display device for displaying a delivered digital data stream, transformed from the enhanced HDR bit stream.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. For expository purposes, the term "horizontal" as used herein is defined as a plane parallel to the active surface of the integrated circuit, having the non-volatile memory system, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The phrase "directly on" means that there is direct contact between elements with no intervening elements.

The term "processing" as used herein includes deposition of material or photoresist, patterning, exposure, development, etching, cleaning, and/or removal of the material or photoresist as required in forming a described structure. The phrase "resistive memory" is defined to be a semiconductor structure that is programmable between a low resistance state and a high resistance state.

Figure 1:
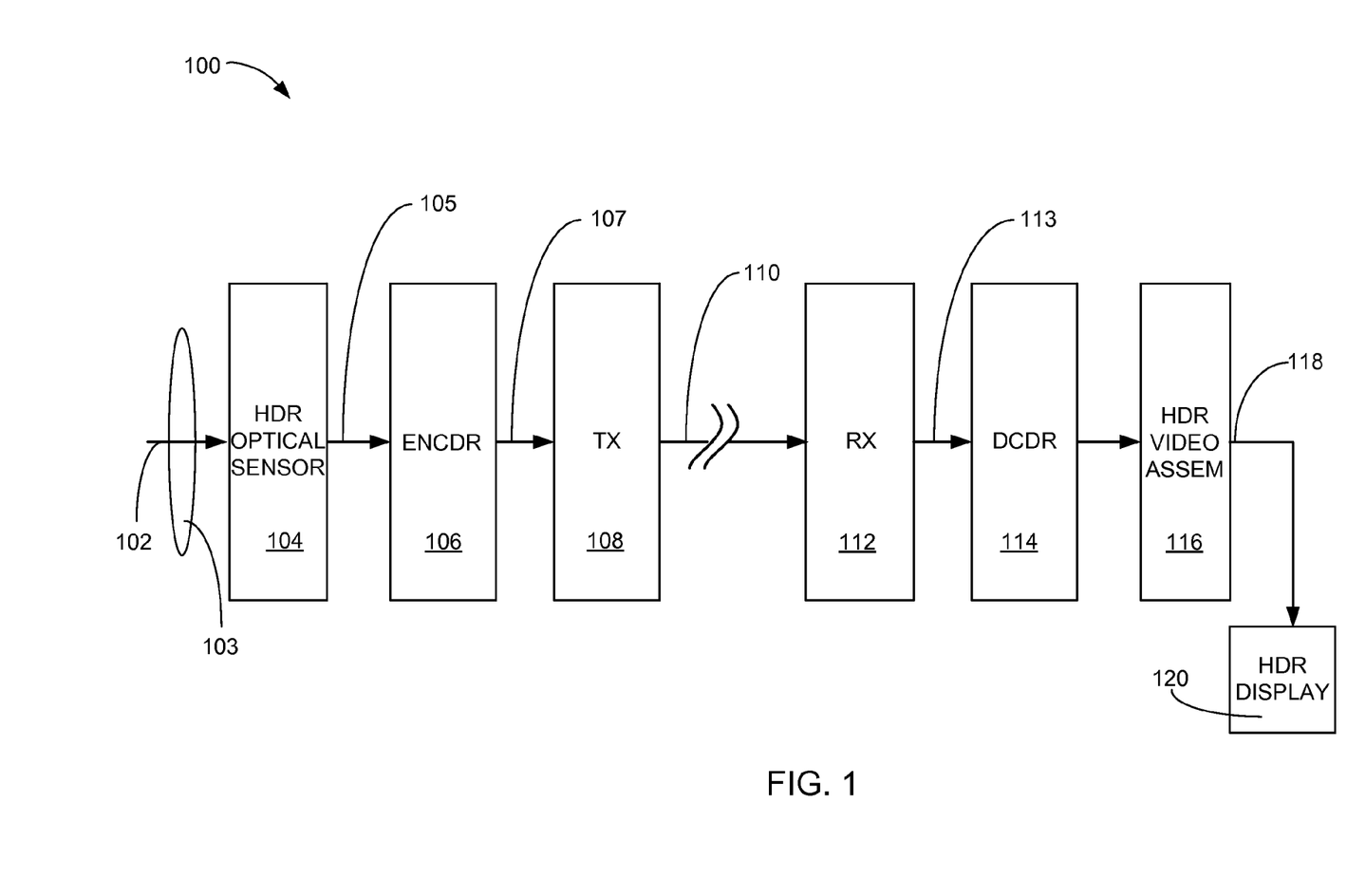
FIG. 1 is an architectural diagram of a video processing system in an embodiment of the present invention.

Referring now to FIG. 1, therein is shown an architectural diagram of a video processing system 100 in an embodiment of the present invention. The architectural diagram of the video processing system 100 depicts an input optical data stream 102, such as a light pattern received through a lens, focused by a lens 103 on a high dynamic range (HDR) optical sensor 104. The HDR optical sensor 104 can monitor the input optical data stream 102 in order to characterize an image from the current segment of the input optical data stream 102. The HDR optical sensor 104 can react to the input optical data stream 102 for generating a pixel stream 105 by detecting the relationship of a series of pixel locations in the HDR optical sensor 104 stimulated by the input optical data stream 102.

The HDR optical sensor 104 can pass the bit stream and a block indicator to a video encoder 106, such as a hardware mathematics array, for encoding and compression of the input optical data stream 102. The video encoder (ENCDR) 106 can minimize a bit length of the average value of an enhanced HDR bit stream 107. The video encoder 106 can support higher bandwidth than prior art solutions because the video encoder 106 can use both long exposure patterns and short exposure patterns from the pixel stream 105 to generate the enhanced HDR bit stream 107.

The enhanced HDR bit stream 107 can be coupled to a transmitter unit (TX) 108, which can transfer the enhanced HDR bit stream 107 to an output device 110. The output device 110 can be hardware, such as a wired or wireless transmission channel, or hard media, such as a compact disc, a digital video disc, or a non-volatile memory device. It is understood that the output device 110 such as the transmission channel can be formed of internal wiring of, for example, a camera that includes a display screen for viewing the subject captured by the HDR optical sensor 104.

The enhanced HDR bit stream 107 can be received by a receiver module (RX) 112, through the output device 110, which can transform the output device 110 back into a receiver bit stream 113, which can be equivalent to the enhanced HDR bit stream 107 and associated x-y coordinate information. The receiver module 112 can be coupled to a video decoder 114, such as a hardware mathematics array, to convey the enhanced HDR bit stream 107. The video decoder (DCDR) 114 can reverse the operations of the video encoder 106 without reducing any quality from the input optical data stream 102.

The video decoder 114 can be coupled to an HDR video assembly unit 116 for reconstructing the pixel stream 105 for assembling a delivered digital data stream 118. The complete transfer from the input optical data stream 102 to the delivered digital data stream 118 is performed with no loss in the quality of the signal. The delivered digital data stream 118 can be coupled to a HDR Display device 120 for displaying a video image, replicating the input optical data stream 102, having better contrast and more detail than is available from standard dynamic range systems.

It has been discovered that the video processing system 100 can parameterize the group size of the coding structure of an input optical data stream 102 in order to minimize the average bit length of the enhanced HDR bit stream 107. The video processing system 100 can compress video streams with great efficiency by using both the long exposure patterns and the short exposure patterns from the pixel stream 105. The video processing system 100 can process the delivered digital data stream 118 with a 7-10 dB improvement in the signal to noise ratio over the standard mobile imaging architecture (SMIA) codec (not shown).

Figure 2:
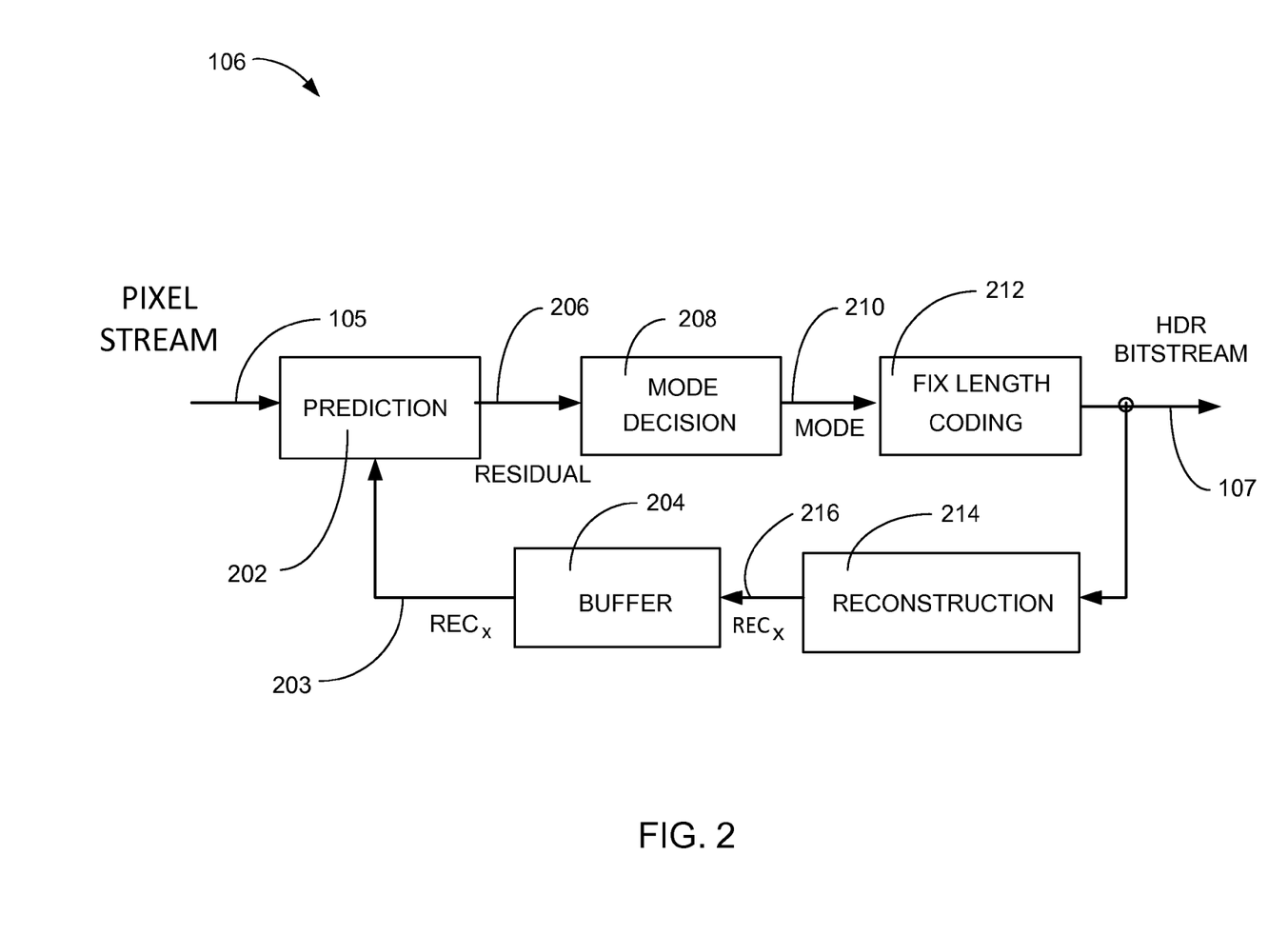
FIG. 2 is a functional block diagram of the video encoder of FIG. 1.

Referring now to FIG. 2, therein is shown a functional block diagram of the video encoder 106 of FIG. 1. The functional block diagram of the video encoder 106 depicts the pixel stream 105 coupled to a video encoder prediction unit 202, such as a hardware mathematics array, for encoding and compressing the pixel stream 105.

The video encoder prediction unit 202 can analyze the pixel stream 105 for determining how the compression of the pixel stream 105 should progress. While standard dynamic range codecs can compress a 10 bit pixel string into 8 bits, the video encoder 106 can compress the pixel stream 105 from 10 bits per pixel to 6 bits while maintaining full detail of the image captured by the HDR optical sensor 104 of FIG. 1.

A previous pixel buffer 204 can be coupled to the video encoder prediction unit 202 for providing up to the five previous samples of a reconstructed pixel value array 203 for generation of a residual indicator 206 of the current pixel being evaluated by the video encoder prediction unit 202. The residual indicator 206 has a six bit content remaining from the ten bit content of the pixel stream 105. The reconstructed pixel value array 203 can be provided by a parallel bus between the previous pixel buffer 204 and the video encoder prediction unit 202. It is understood that the previous pixel buffer 204 can be a memory structure, a shift register, a combinational logic array, or a combination thereof.

A mode decision unit 208 can generate mode data 210 that reflects the encoded value of the current pixel being processed through the video encoder prediction unit 202. The mode data 210 can be processed by a fixed length coding unit 212, including assembling the residual indicator (206) having a six bit content, to form the enhanced HDR bit stream 107.

A reconstruction unit 214 can monitor the enhanced HDR bit stream 107 in order to reconstruct the value of the current pixel being evaluated by the video encoder prediction unit 202. The speed with which the pixel stream 105 is processed allows plenty of time for the coding and reconstruction to occur. At the selection of the next pixel in the pixel stream 105, a reconstructed pixel 216 representing the previously processed pixel is loaded into the previous pixel buffer 204 and the coding and reconstruction process once again starts.

It is understood that the timing of the analysis of the pixel stream 105 is coordinated to preserve the integrity of the residual indicator 206 and the reconstructed pixel 216 as the pixel stream 105 is shifted through the video encoder prediction unit 202. While the previous pixel buffer 204 is able to maintain the value of at least five of the previous values of the pixel stream 105, it can maintain the value of more than five values from the pixel stream 105 for future enhancements.

Figure 3:
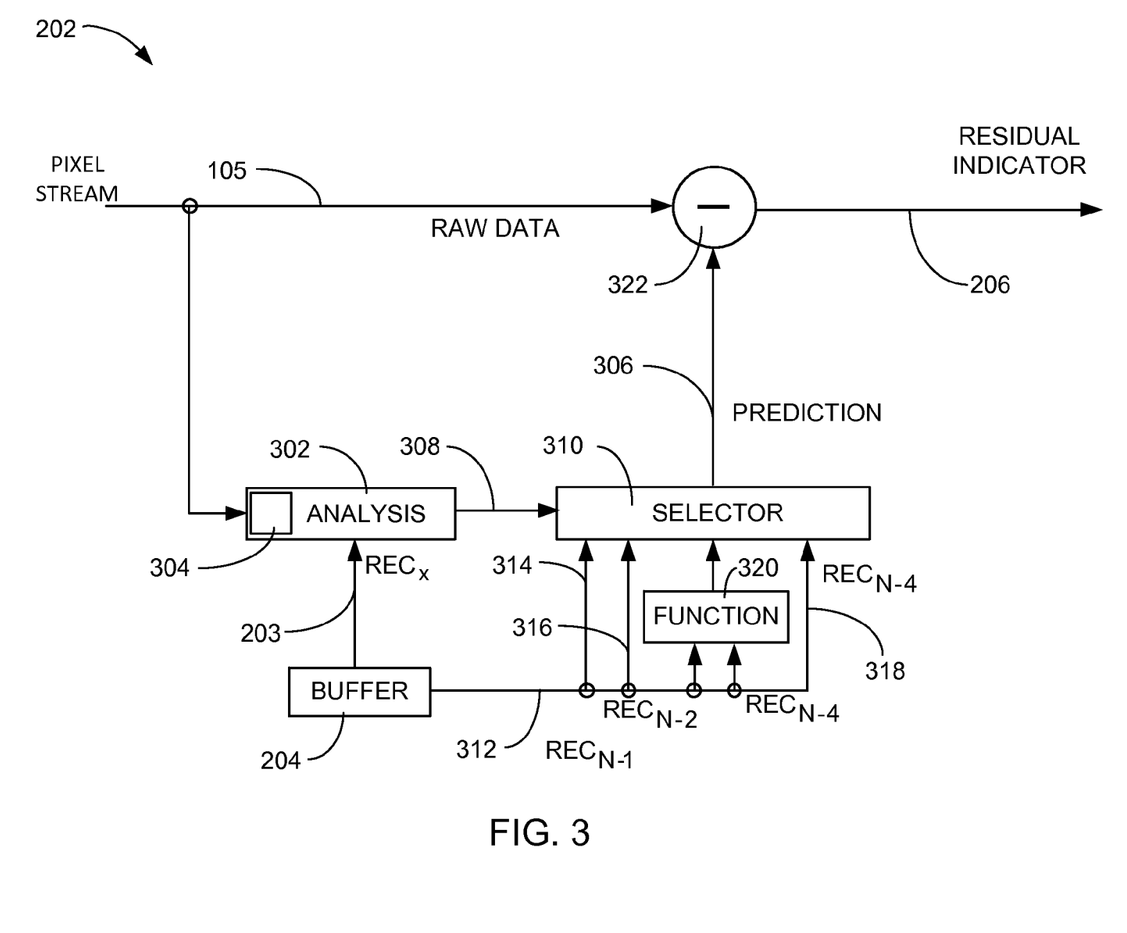
FIG. 3 is a functional block diagram of the video encoder prediction unit of FIG. 2.

Referring now to FIG. 3, therein is shown a functional block diagram of the video encoder prediction unit 202 of FIG. 2. The functional block diagram of the video encoder prediction unit 202 depicts a pixel analysis unit 302, such as a comparator array, combinational logic, mathematics unit, or a combination thereof, coupled to the pixel stream 105.

The pixel analysis unit 302 can have a current pixel register 304 for capturing a sample from the pixel stream 105. The pixel analysis unit 302 can be coupled to the previous pixel buffer 204 for receiving the reconstructed pixel value array 203. The pixel analysis unit 302 can select the appropriate term for generating a prediction 306 based on the values of the reconstructed pixel value array 203. The pixel analysis unit 302 can generate a prediction select bus 308 for controlling a prediction selector 310, such as a multiplexer or gated logic structure.

The previous pixel buffer 204 can generate a pixel history bus 312 for coupling to the prediction selector 310. The prediction selector 310 can pass a reconstructed pixel (N−1) 314, a reconstructed pixel (N−2) 316, a reconstructed pixel (N−4) 318, or a function 320 of the reconstructed pixel (N−2) 316 and the reconstructed pixel (N−4) 318. The function 320 can be a linear function, an exponential function, an inverse function, or the like. As an example the function 320 can be an average such as:

$$\text{Function} = (REC_{N-2} + REC_{N-4} + 1)/2 \quad \text{(Equation 1)}$$

Where $REC_{N-2}$ is the reconstructed pixel (N−2) 316 and the $REC_{N-4}$ is the reconstructed pixel (N−4) 318.

A prediction adder 322 can subtract the prediction 306 from the pixel stream 105 in order to generate the residual indicator 206. The prediction adder 322 can be a scaling adder that accepts the pixel stream 105 as a 10 bit symbol and subtracts the prediction 306 as a 10 bit symbol of the reconstructed pixels from the pixel history bus 312.

Figure 4:
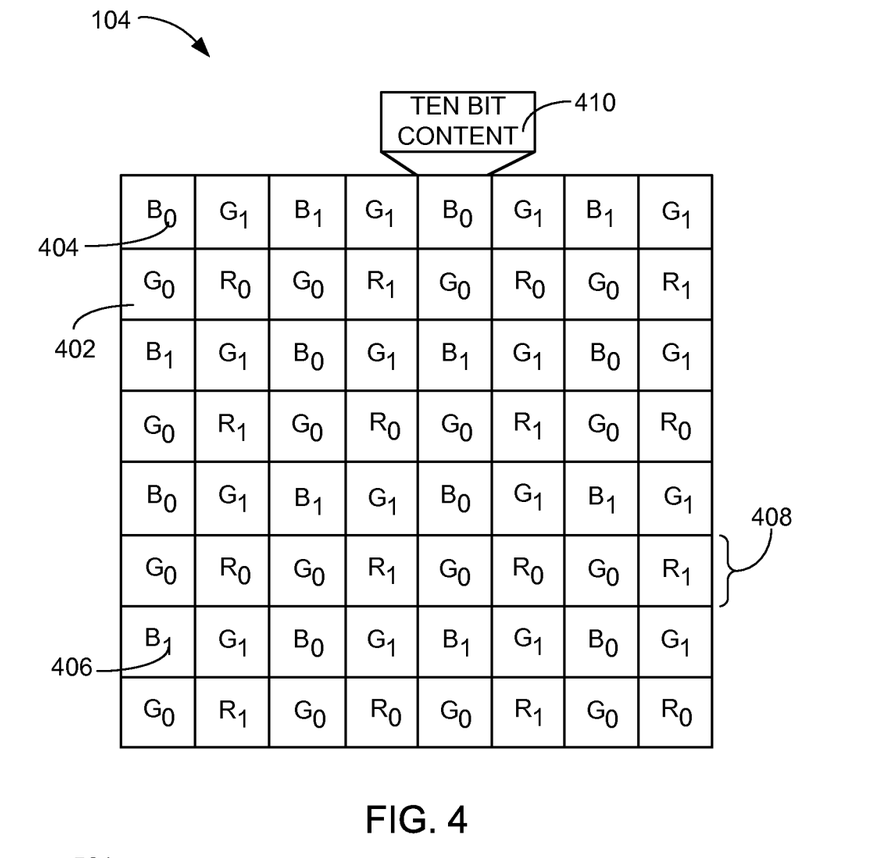
FIG. 4 is an architectural diagram of a high dynamic range (HDR) optical sensor in an exemplary embodiment of the present invention.

Referring now to FIG. 4, therein is shown an architectural diagram of the high dynamic range (HDR) optical sensor 104 in an exemplary embodiment of the present invention. The HDR optical sensor 104 can have a plurality of pixel sensors 402 having long exposure patterns 404 and short exposure patterns 406. The long exposure patterns 404 are represented by the color having a subscript 0. The short exposure patterns 406 are represented by the color having a subscript 1.

The HDR optical sensor 104 can be formed of lines 408 of the pixel sensors 402. Each of the pixel sensors 402 can include a ten bit content 410 when read by the video encoder 106 of FIG. 1. The sequence of the long exposure patterns 404 and the short exposure patterns 406 in the lines is an example only and can be different sequences. The primary colors can be represented by red, green, and blue as an example only. Other combinations can be implemented, such as cyan, magenta, yellow, and black without changing the inventive structure of the video processing system 100 of FIG. 1.

Figure 5:
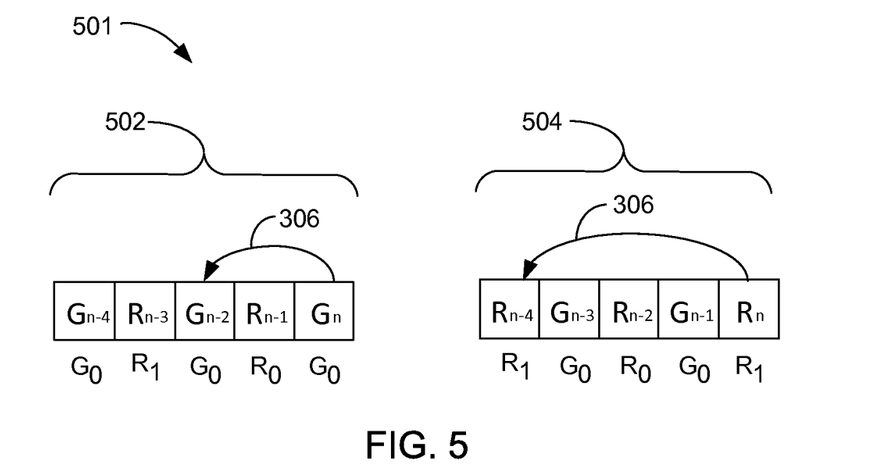
FIG. 5 is an example of an embodiment of the video processing system in a first embodiment of the present invention.

Referring now to FIG. 5, therein is shown an example of an embodiment of the video processing system 100 in a first embodiment 501 of the present invention. The first embodiment 501 of the video processing system 100 depicts a first category 502 and a second category 504. In the first category, the prediction 306 can be differentiated based on sampling the current pixel register 304 of FIG. 3 being a first color, such as green, without regard to the first color being a long exposure pattern or a short exposure pattern. If the current pixel register 304 is the first color, the prediction selector 310 of FIG. 3 can pass the reconstructed pixel (N−2) 316 of FIG. 3, having the same color and the same exposure pattern as the current pixel register 304, as the prediction 306. In the second category 504, the current pixel register 304 is a second color, such as red or blue, without regard to the second color being a long exposure pattern or a short exposure pattern. If the current pixel register 304 is the second color, the prediction selector 310 can pass the reconstructed pixel (N−4) 318, having the same color and the same exposure pattern as the current pixel register 304, as the prediction 306.

It has been discovered that the first embodiment 501 of the video processing system 100 can provide more detail to the HDR display device 120 of FIG. 1 while providing an average peak signal to noise ratio (PSNR) of 56.20 dB.

Figure 6:
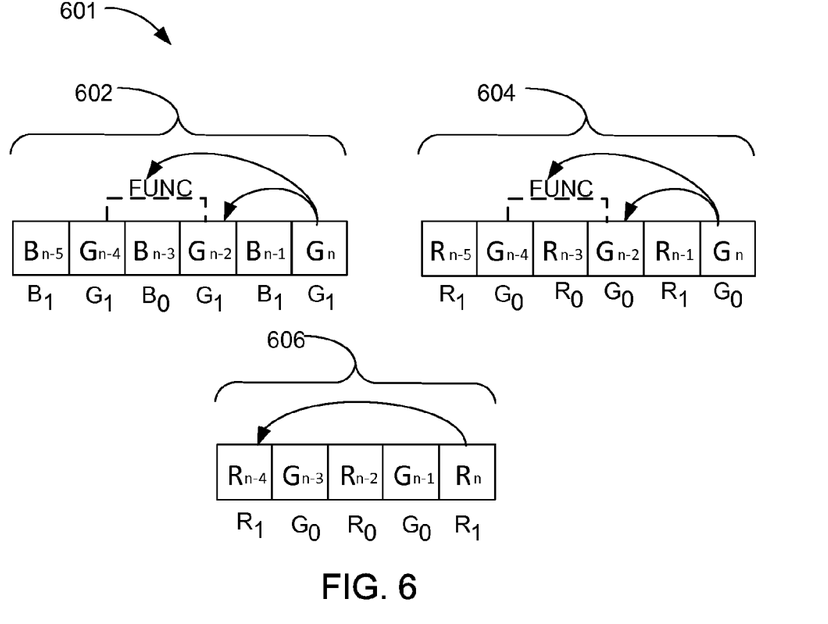
FIG. 6 is an example of an embodiment of the video processing system in a second embodiment of the present invention.

Referring now to FIG. 6, therein is shown an example of an embodiment of the video processing system 100 in a second embodiment 601 of the present invention. The second embodiment 601 of the video processing system 100 depicts a first predictive strategy 602, a second predictive strategy 604, and a third predictive strategy 606.

In the first predictive strategy 602, the prediction 306 can be differentiated based on the current pixel register 304 of FIG. 3 being a first color, such as green, without regard to the first color being a long exposure pattern or a short exposure pattern. However, the current pixel register 304 and the reconstructed pixel (N−1) 314 must match the long exposure pattern or the short exposure pattern. If the current pixel register 304 contains a pixel of the first color, the pixel analysis unit 302 of FIG. 3 can calculate equation 2 in order to determine the value of the prediction 306 by:

$$x = (((\text{Recn}-4 \leq \text{Recn}-2) \text{ and } (\text{Recn}-5 \leq \text{Recn}-1)) \text{ or } ((\text{Recn}-4 \geq \text{Recn}-2) \text{ and } (\text{Recn}-5 \geq \text{Recn}-1))) \quad \text{(Equation 2)}$$

Where x is a determination value for the prediction 306, Recn−1 is the reconstructed pixel (N−1) 314, Recn−2 is the reconstructed pixel (N−2) 316, Recn−4 is the reconstructed pixel (N−4) 318, and Recn−5 is a reconstructed pixel (N−5). If x is true then:

$$\text{Prediction} = \text{Recn}-2 \quad \text{(Equation 3)}$$

If x is not true then:

$$\text{Prediction} = \text{Function}(\text{Recn}-2, \text{Recn}-4) \quad \text{(Equation 4)}$$

In Equation 4, the Function can be the function 320 such as a linear function, an exponential function, an inverse function, or the like. By way of an example the function 320 can be the same function as shown in Equation 1 or some other relationship between Recn−2 and Recn−4.

In the second predictive strategy 604, the prediction 306 can be differentiated based on the current pixel register 304 being a first color, such as green, without regard to the first color being a long exposure pattern or a short exposure pattern. However, the current pixel register 304 and the reconstructed pixel (N−1) 314 must not match the long exposure pattern or the short exposure pattern. If the current pixel register 304 is the first color, the prediction selector 310 can calculate Equation 2 in order to determine the value of the prediction 306, as determined by Equation 3 and Equation 4.

The third predictive strategy 606 can determine the prediction 306 when the current pixel register 304 is a second color, such as red or blue, without regard to the second color being a long exposure pattern or a short exposure pattern. If the current pixel register 304 is the second color, the prediction selector 310 can pass the reconstructed pixel (N−4) 318, having the same color and the same exposure pattern as the current pixel register 304, as the prediction 306.

It has been discovered that the second embodiment 601 of the video processing system 100 can provide more detail to the HDR display device 120 of FIG. 1 while providing an average peak signal to noise ratio (PSNR) of 56.24 dB.

Figure 7:
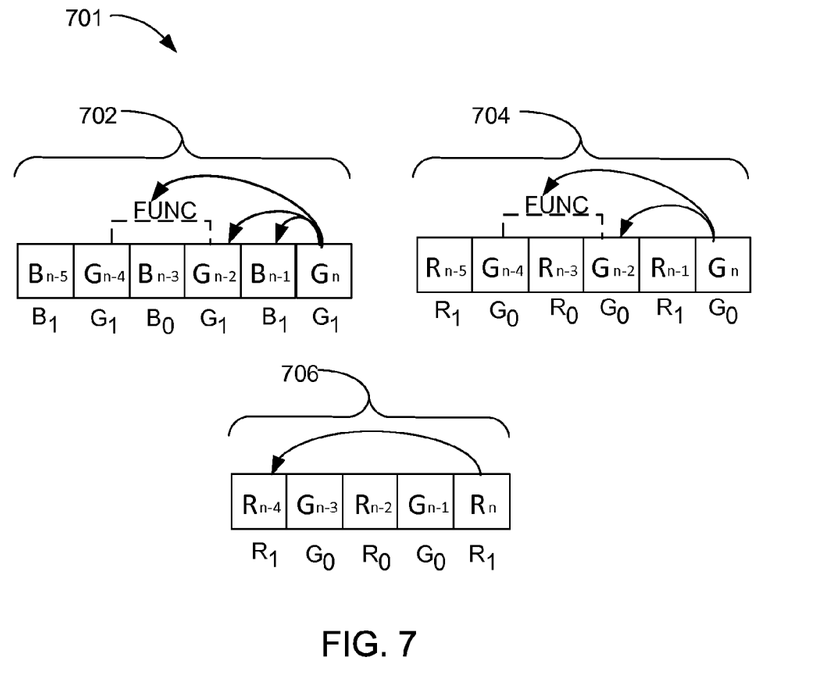
FIG. 7 is an example of an embodiment of the video processing system in a third embodiment of the present invention.

Referring now to FIG. 7, therein is shown an example of an embodiment of the video processing system 100 in a third embodiment 701 of the present invention. The third embodiment 701 of the video processing system 100 depicts a first predictive strategy 702, a second predictive strategy 704, and a third predictive strategy 706.

In the first predictive strategy 702, the prediction 306 of FIG. 3 can be differentiated based on the current pixel register 304 of FIG. 3 being a first color, such as green, without regard to the first color being a long exposure pattern or a short exposure pattern. However, the current pixel register 304 and the reconstructed pixel (N−1) 314 must match the long exposure pattern or the short exposure pattern. If the current pixel register 304 is the first color, the pixel analysis unit 302 of FIG. 3 can calculate equation 5 in order to determine the value of the prediction 306 by:

$$x = (((Recn-4 \le Recn-2) \text{ and } (Recn-2 \le Recn-1)) \text{ or } ((Recn-4 \ge Recn-2) \text{ and } (Recn-2 \ge Recn-1)))\quad \text{(Equation 5)}$$

Where x is a determination value for the prediction 306, Recn−1 is the reconstructed pixel (N−1) 314, Recn−2 is the reconstructed pixel (N−2) 316, and Recn−4 is the reconstructed pixel (N−4) 318. If x is true, then:

$$\text{Prediction} = Recn-1 \quad \text{(Equation 6)}$$

If x is not true then:

$$y = (((Recn-4 \le Recn-2) \text{ and } (Recn-5 \le Recn-1)) \text{ or } ((Recn-4 \ge Recn-2) \text{ and } (Recn-5 \ge Recn-1)))\quad \text{(Equation 7)}$$

Where y is a determination value for the prediction 306, Recn−1 is the reconstructed pixel (N−1) 314, Recn−2 is the reconstructed pixel (N−2) 316, Recn−4 is the reconstructed pixel (N−4) 318, and Recn−5 is a reconstructed pixel (N−5). If y is true then:

$$\text{Prediction} = Recn-2 \quad \text{(Equation 3)}$$

If y is not true then:

$$\text{Prediction} = \text{Function}(Recn-2, Recn-4) \quad \text{(Equation 4)}$$

In Equation 4, the Function can be the function 320 such as a linear function, an exponential function, an inverse function, or the like. By way of an example the function 320 can be the same function as shown in Equation 1 or some other relationship between Recn−2 and Recn−4).

In the second predictive strategy 704, the prediction 306 can be differentiated based on the content of the current pixel register 304 being a first color, such as green, without regard to the first color being a long exposure pattern or a short exposure pattern. However, the content of the current pixel register 304 and the reconstructed pixel (N−1) 314 must not match the long exposure pattern or the short exposure pattern. If the current pixel register 304 contains a pixel of the first color, the pixel analysis unit 302 can calculate equation 2 in order to determine the value of the prediction 306 by:

$$x = (((Recn-4 \le Recn-2) \text{ and } (Recn-5 \le Recn-1)) \text{ or } ((Recn-4 \ge Recn-2) \text{ and } (Recn-5 \ge Recn-1)))\quad \text{(Equation 2)}$$

Where x is a determination value for the prediction 306, Recn−1 is the reconstructed pixel (N−1) 314, Recn−2 is the reconstructed pixel (N−2) 316, Recn−4 is the reconstructed pixel (N−4) 318, and Recn−5 is a reconstructed pixel (N−5). If x is true then:

$$\text{Prediction} = Recn-2 \quad \text{(Equation 3)}$$

If x is not true then:

$$\text{Prediction} = \text{Function}(Recn-2, Recn-4) \quad \text{(Equation 4)}$$

In Equation 4, the Function can be the function 320 such as a linear function, an exponential function, an inverse function, or the like. By way of an example the function 320 can be the same function as shown in Equation 1 or some other relationship between Recn−2 and Recn−4).

The third predictive strategy 706 can determine the prediction 306 when the content of the current pixel register 304 is a second color, such as red or blue, without regard to the second color being a long exposure pattern or a short exposure pattern. If the content of the current pixel register 304 is the second color, the prediction selector 310 can pass the reconstructed pixel (N−4) 318, having the same color and the same exposure pattern as the current pixel register 304, as the prediction 306.

It has been discovered that the third embodiment 701 of the video processing system 100 can provide more detail to the HDR display device 120 of FIG. 1 while providing an average peak signal to noise ratio (PSNR) of 54.06 dB.

Figure 8:
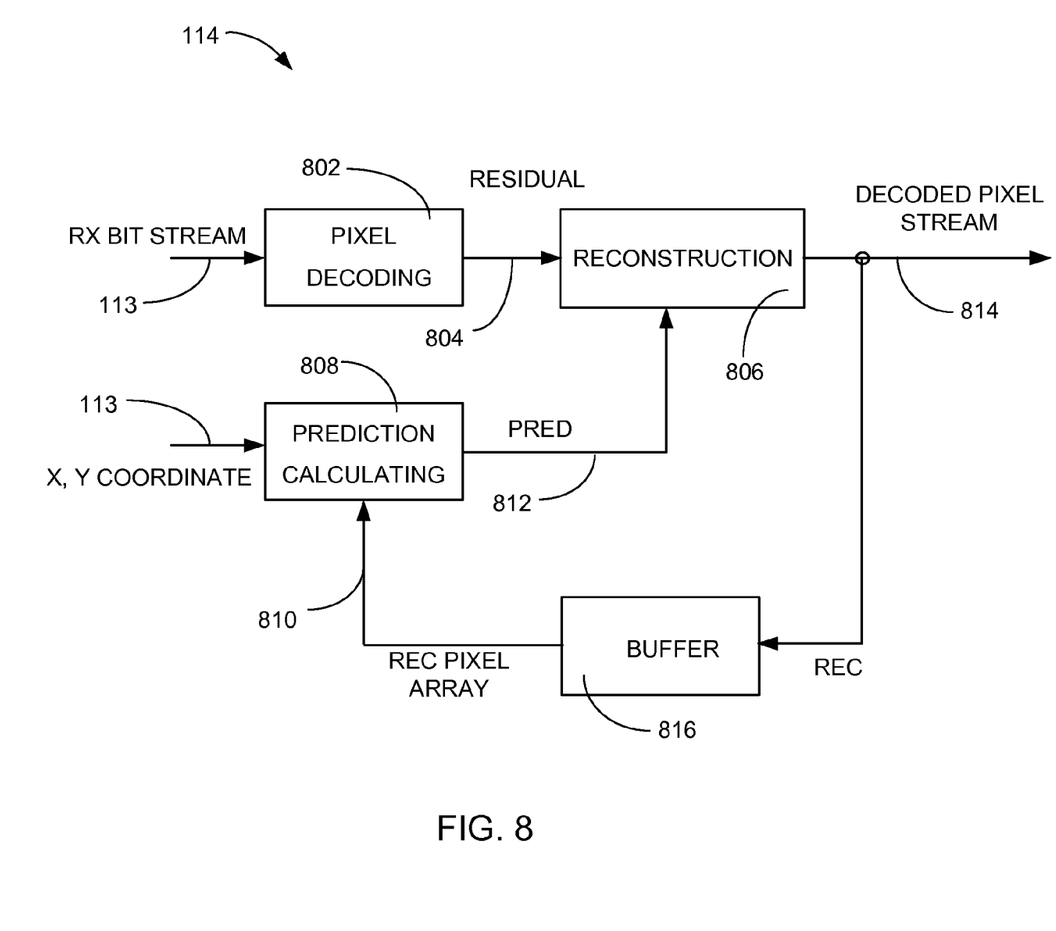
FIG. 8 is a functional block diagram of the video decoder of FIG. 1 in an embodiment of the present invention.

Referring now to FIG. 8, therein is shown a functional block diagram of the video decoder 114 of FIG. 1 in an embodiment of the present invention. The functional block diagram of the video decoder 114 depicts the receiver bit stream 113 coupled to a pixel decoding unit 802, such as a combinational logic array, a look-up table, a memory array, or the like.

The pixel decoding unit 802 can reverse the operation of the video encoder 106 of FIG. 1. The receiver bit stream 113 can also include x-y coordinate information provided by the receiver module 112 of FIG. 1. The pixel decoding unit 802 generates a residual code 804, which is provided to a reconstruction unit 806.

A prediction calculating unit 808 can receive the x-y coordinate portion of the receiver bit stream 113 and a reconstructed pixel value array 810, which can provide at least the last five instances of the reconstructed pixels. The prediction calculating unit 808 can calculate a prediction 812 for guiding the reconstruction unit 806 in the reconstruction of a decoded pixel stream 814.

The decoded pixel stream 814 can be coupled to a previous pixel buffer 816, such as a memory structure, a shift register, a combinational logic array, or a combination thereof. The previous pixel buffer 816 can provide at least the last five instances of the reconstructed pixel values, which are used by the prediction calculating unit 808 for calculating the prediction 812.

It has been discovered that the video decoder 114 can provide the decoded pixel stream 814 to identically match the enhanced HDR bit stream 107 of FIG. 1. The result of the compression provided by the video processing system 100 can provide up to a 40% reduction in the bandwidth required to provide the decoded pixel stream 814.

Figure 9:
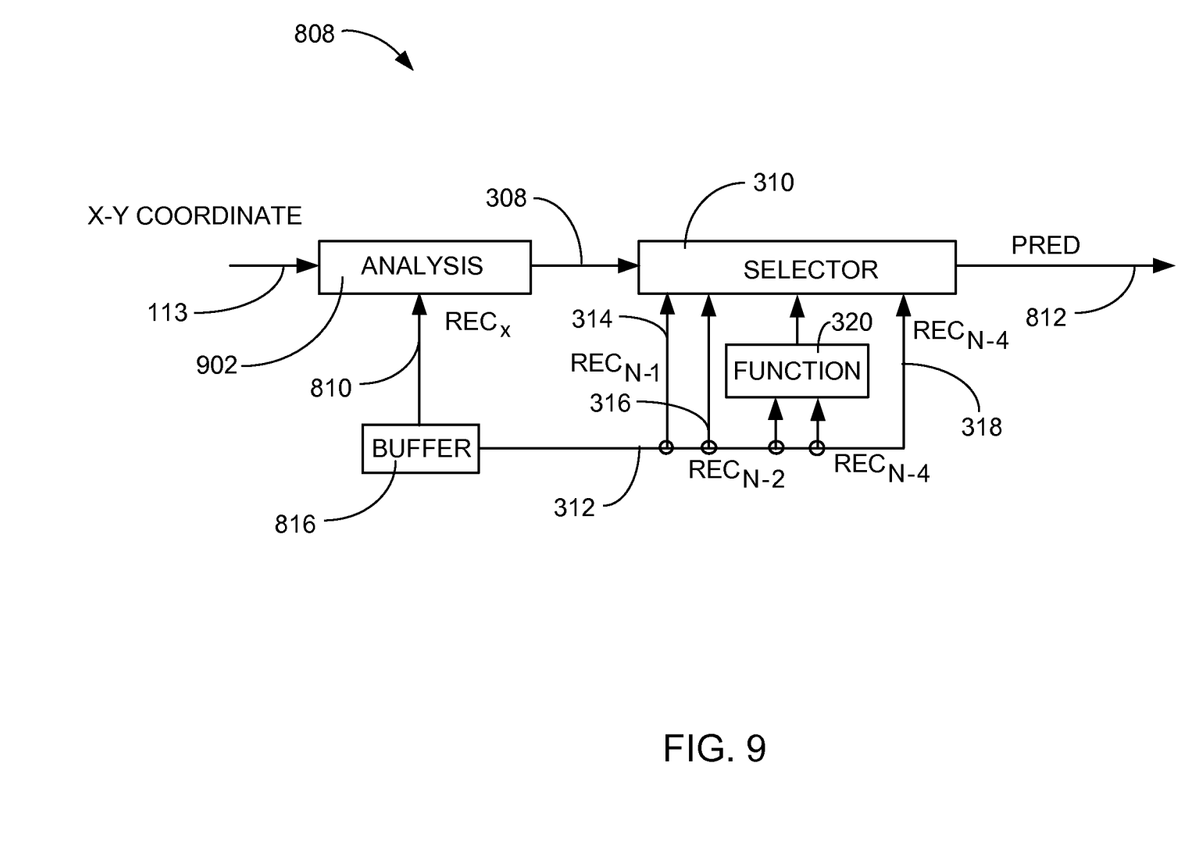
FIG. 9 is a functional block diagram of the video decoder prediction unit of FIG. 8.

Referring now to FIG. 9, therein is shown a functional block diagram of the video decoder prediction unit 808 of FIG. 8. The functional block diagram of the video decoder prediction unit 808 depicts a pixel analysis unit 902 coupled to the receiver bit stream 113 and a reconstructed pixel value array 810, which can provide at least the last five instances of the reconstructed pixels. The pixel analysis unit 902 can select the appropriate term for generating a prediction 812 based on the values of the reconstructed pixel value array 810. The pixel analysis unit 902 can generate a prediction select bus 308 for controlling a prediction selector 310, such as a multiplexer or gated logic structure.

The previous pixel buffer 816 can generate the pixel history bus 312 for coupling to the prediction selector 310. The prediction selector 310 can pass the reconstructed pixel (N−1) 314, the reconstructed pixel (N−2) 316, the reconstructed pixel (N−4) 318, or the function 320 of the reconstructed pixel (N−2) 316 and the reconstructed pixel (N−4) 318. The function 320 can be a linear function, an exponential function, an inverse function, or the like. As an example the function 320 can be an average such as:

$$\text{Function}=(REC_{N-2}+REC_{N-4}+1)/2 \quad \text{(Equation 1)}$$

Where $REC_{N-2}$ is the reconstructed pixel (N−2) 316 and the $REC_{N-4}$ is the reconstructed pixel (N−4) 318.

It has been discovered that the video decoder prediction unit 808 can identically restore the prediction 812 that was used to generate the enhanced HDR bit stream 107 of FIG. 1. By identically restoring the prediction 812, the video processing system 100 of FIG. 1 can reduce the bandwidth required to transfer the enhanced HDR bit stream 107 while delivering enhanced visual clarity and detail to the HDR Display device 120 of FIG. 1.

Figure 10:
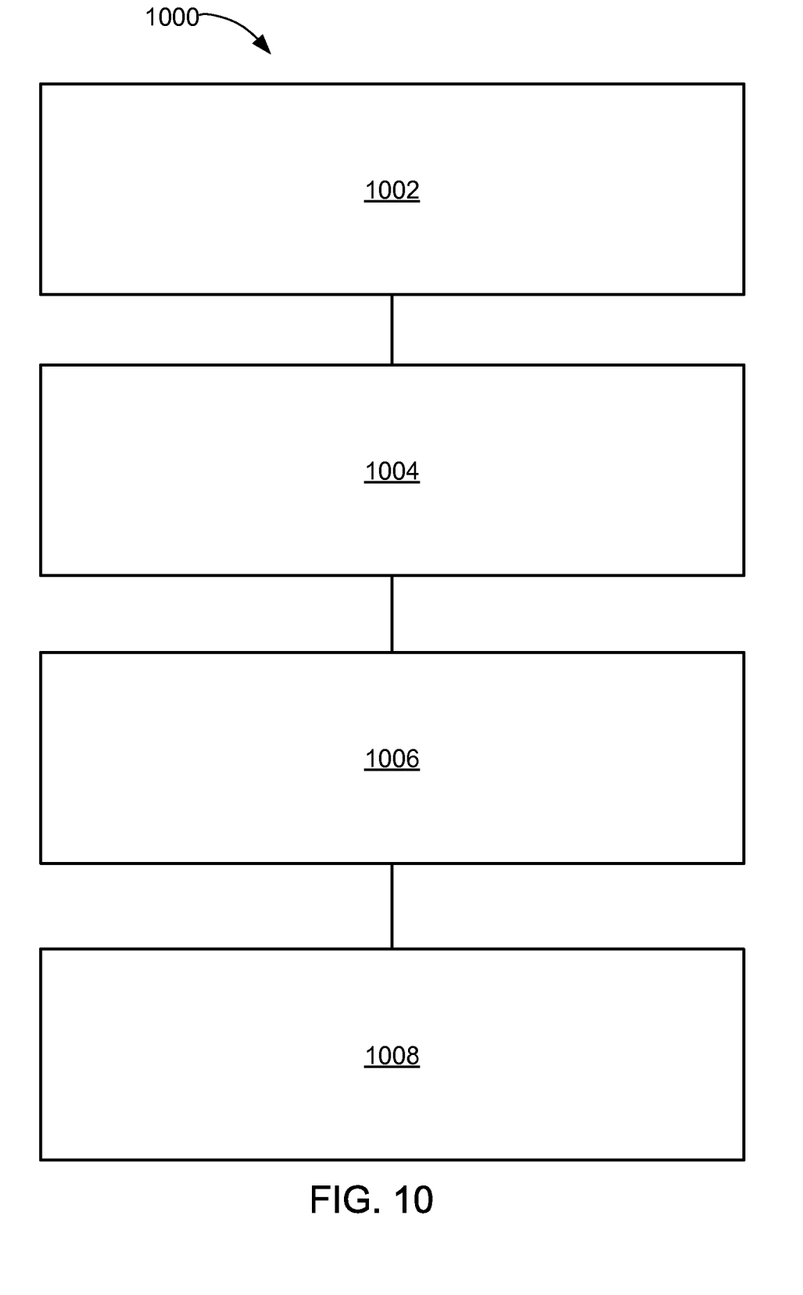
FIG. 10 is a flow chart of a method of operation of a video processing system in a further embodiment of the present invention.

Referring now to FIG. 10, therein is shown a flow chart of a method 1000 of operation of a video processing system in a further embodiment of the present invention. The method 1000 includes: accessing a high dynamic range (HDR) optical sensor having long exposure patterns and short exposure patterns in a block 1002; generating a prediction from the long exposure patterns and the short exposure patterns in a block 1004; encoding an enhanced HDR bit stream from the prediction in a block 1006; and displaying a delivered digital data stream, transformed from the enhanced HDR bit stream, on a HDR display device in a block 1008.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a video processing system comprising:
    accessing a high dynamic range (HDR) optical sensor having long exposure patterns and short exposure patterns;
    generating a prediction from the long exposure patterns and the short exposure patterns, wherein the prediction is selected from a first category and a second category, wherein in the first category, the prediction is based on sampling a current pixel register being a first color, and when the current pixel register is the first color, a first reconstructed pixel is passed having a same color and same exposure pattern as the current pixel register, wherein in the second category, the current pixel register is a second color, and when the current pixel register is the second color, a second reconstructed pixel is passed having the same color and same exposure pattern as the current pixel register;
    encoding an enhanced HDR bit stream from the prediction; and
    displaying a delivered digital data stream, transformed from the enhanced HDR bit stream, on a HDR display device.

2. The method as claimed in claim 1 further comprising focusing an input optical data stream on the HDR optical sensor.

3. The method as claimed in claim 1 further comprising transforming a receiver bit stream by receiving the enhanced HDR bit stream.

4. The method as claimed in claim 1 further comprising generating a pixel stream from the HDR optical sensor.

5. The method as claimed in claim 1 further comprising transferring, through an output device, the enhanced HDR bit stream.

6. A method of operation of a video processing system comprising:
    accessing a high dynamic range (HDR) optical sensor, having a plurality of pixel sensors, with long exposure patterns and short exposure patterns;
    generating a prediction from the long exposure patterns and the short exposure patterns including sampling a current pixel register, wherein the prediction is selected from a first category and a second category, wherein in the first category, the prediction is based on sampling a current pixel register being a first color, and when the current pixel register is the first color, a first reconstructed pixel is passed having a same color and same exposure pattern as the current pixel register, wherein in the second category, the current pixel register is a second color, and when the current pixel register is the second color, a second reconstructed pixel is passed having the same color and same exposure pattern as the current pixel register;
    encoding an enhanced HDR bit stream from the prediction including selecting the first reconstructed pixel, the second reconstructed pixel, or a combination thereof; and
    displaying a delivered digital data stream, transformed from the enhanced HDR bit stream, on a HDR display device including replicating an input optical data stream.

7. The method as claimed in claim 6 further comprising activating a line of the pixel sensors by focusing the input optical data stream on the HDR optical sensor.

8. The method as claimed in claim 6 further comprising transforming a receiver bit stream by receiving the enhanced HDR bit stream including assembling a residual indicator having a six bit content for generating the enhanced HDR bit stream.

9. The method as claimed in claim 6 further comprising generating a pixel stream from the HDR optical sensor including capturing the current pixel register for selecting the prediction.

10. The method as claimed in claim 6 further comprising transferring, through an output device, the enhanced HDR bit stream including transferring through a wired transmission channel, a digital video disc, a compact disc, or a non-volatile memory device.

11. A method of operation of a video processing system comprising:
   accessing a high dynamic range (HDR) optical sensor having long exposure patterns and short exposure patterns;
   generating a prediction from the long exposure patterns and the short exposure patterns, wherein the prediction is selected from a first category and a second category;
   encoding an enhanced HDR bit stream from the prediction, wherein in the first category, the prediction is based on sampling a current pixel register being a first color, and when the current pixel register is the first color, a first reconstructed pixel is passed having a same color and same exposure pattern as the current pixel register, wherein in the second category, the current pixel register is a second color, and when the current pixel register is the second color, a second reconstructed pixel is passed having the same color and same exposure pattern as the current pixel register; and
   transferring, through an output device, the enhanced HDR bit stream.

12. A method of operation of a video processing system comprising:
   receiving an enhanced HDR bit stream, wherein the enhanced HDR bit stream is encoded using a prediction selected from a first category and a second category, wherein in the first category, the prediction is based on sampling a current pixel register being a first color, and when the current pixel register is the first color, a first reconstructed pixel is passed having a same color and same exposure pattern as the current pixel register, wherein in the second category, the current pixel register is a second color, and when the current pixel register is the second color, a second reconstructed pixel is passed having the same color and same exposure pattern as the current pixel register; and
   transforming a receiver bit stream from the enhanced HDR bit stream for displaying on a HDR display device.

13. A video processing system comprising:
   a high dynamic range (HDR) optical sensor having long exposure patterns and short exposure patterns;
   a prediction hardware, coupled to the HDR optical sensor, for generating a prediction from the long exposure patterns and the short exposure patterns, wherein the prediction is selected from a first category and a second category, wherein in the first category, the prediction is based on sampling a current pixel register being a first color, and when the current pixel register is the first color, a first reconstructed pixel is passed having a same color and same exposure pattern as the current pixel register, wherein in the second category, the current pixel register is a second color, and when the current pixel register is the second color, a second reconstructed pixel is passed having the same color and same exposure pattern as the current pixel register;
   a fixed length coding hardware, coupled to the prediction hardware, for encoding an enhanced HDR bit stream from the prediction; and
   a HDR display device for displaying a delivered digital data stream, transformed from the enhanced HDR bit stream.

14. The system as claimed in claim 13 further comprising a lens optically coupled to the HDR optical sensor for focusing an input optical data stream on the HDR optical sensor.

15. The system as claimed in claim 13 further comprising a receiver hardware for transforming a receiver bit stream by receiving the enhanced HDR bit stream.

16. The system as claimed in claim 13 further comprising a video encoder coupled to the HDR optical sensor for generating a pixel stream from the HDR optical sensor.

17. The system as claimed in claim 13 further comprising an output device for transferring the enhanced HDR bit stream.

18. The system as claimed in claim 13 further comprising:
   a plurality of pixel sensors in the HDR optical sensor;
   a pixel analysis hardware, including the current pixel register, coupled to the HDR optical sensor; and
   a previous pixel buffer coupled to the pixel analysis hardware.

19. The system as claimed in claim 18 further comprising a line of the pixel sensors activated by an input optical data stream focused on the HDR optical sensor.

20. The system as claimed in claim 18 further comprising a receiver hardware for transforming a receiver bit stream includes a residual indicator having a six bit content assembled for generating the enhanced HDR bit stream.

21. The system as claimed in claim 18 further comprising a pixel stream generated from the HDR optical sensor includes the current pixel register for selecting the prediction.

22. The system as claimed in claim 18 further comprising an output hardware for transporting the enhanced HDR bit stream includes a wired transmission channel, a digital video disc, a compact disc, or a non-volatile memory device having the enhanced HDR bit stream thereon.

23. A video processing system comprising:
   a high dynamic range (HDR) optical sensor having long exposure patterns and short exposure patterns;
   a prediction hardware, coupled to the HDR optical sensor, for generating a prediction from the long exposure patterns and the short exposure patterns, wherein the prediction is selected from a first category and a second category, wherein in the first category, the prediction is based on sampling a current pixel register being a first color, and when the current pixel register is the first color, a first reconstructed pixel is passed having a same color and same exposure pattern as the current pixel register, wherein in the second category, the current pixel register is a second color, and when the current pixel register is the second color, a second reconstructed pixel is passed having the same color and same exposure pattern as the current pixel register;
   a fixed length coding hardware, coupled to the prediction hardware, for encoding an enhanced HDR bit stream from the prediction; and an output device for transferring the enhanced HDR bit stream.

24. A video processing system comprising:
a receiver;
a HDR display device; and
an enhanced HDR bit stream, coupled to the receiver, for transforming a receiver bit stream from the enhanced HDR bit stream for displaying on the HDR display device, wherein the enhanced HDR bit stream is encoded using a prediction selected from a first category and a second category, wherein in the first category, the prediction is differentiated based on sampling a current pixel register being a first color, and when the current pixel register is the first color, a first reconstructed pixel is passed having a same color and same exposure pattern as the current pixel register, wherein in the second category, the current pixel register is a second color, and when the current pixel register is the second color, a second reconstructed pixel is passed having the same color and same exposure pattern as the current pixel register.

* * * * *